Figure 4:
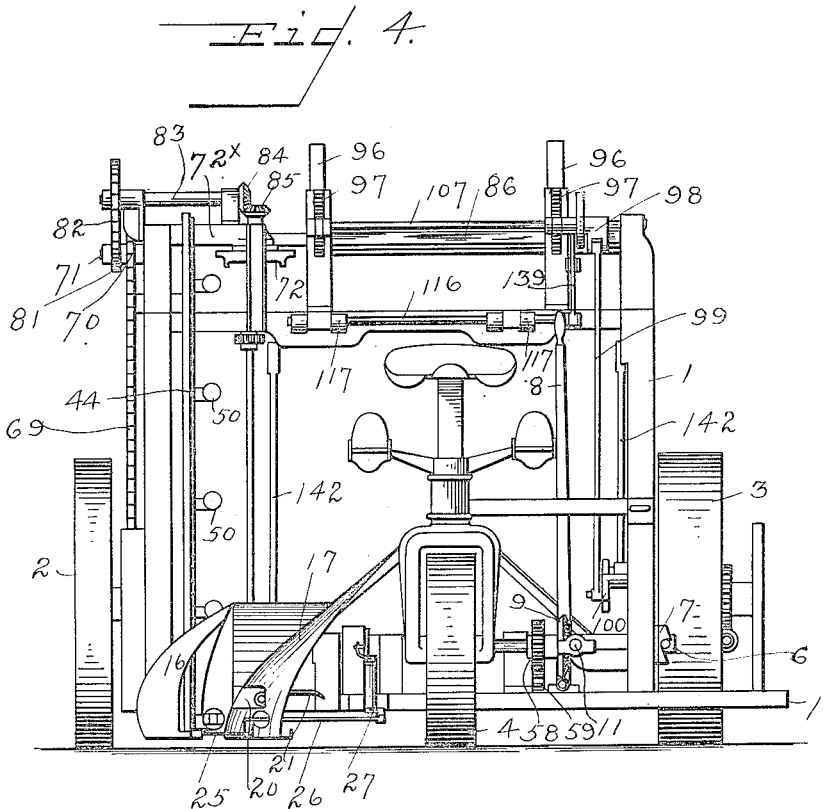

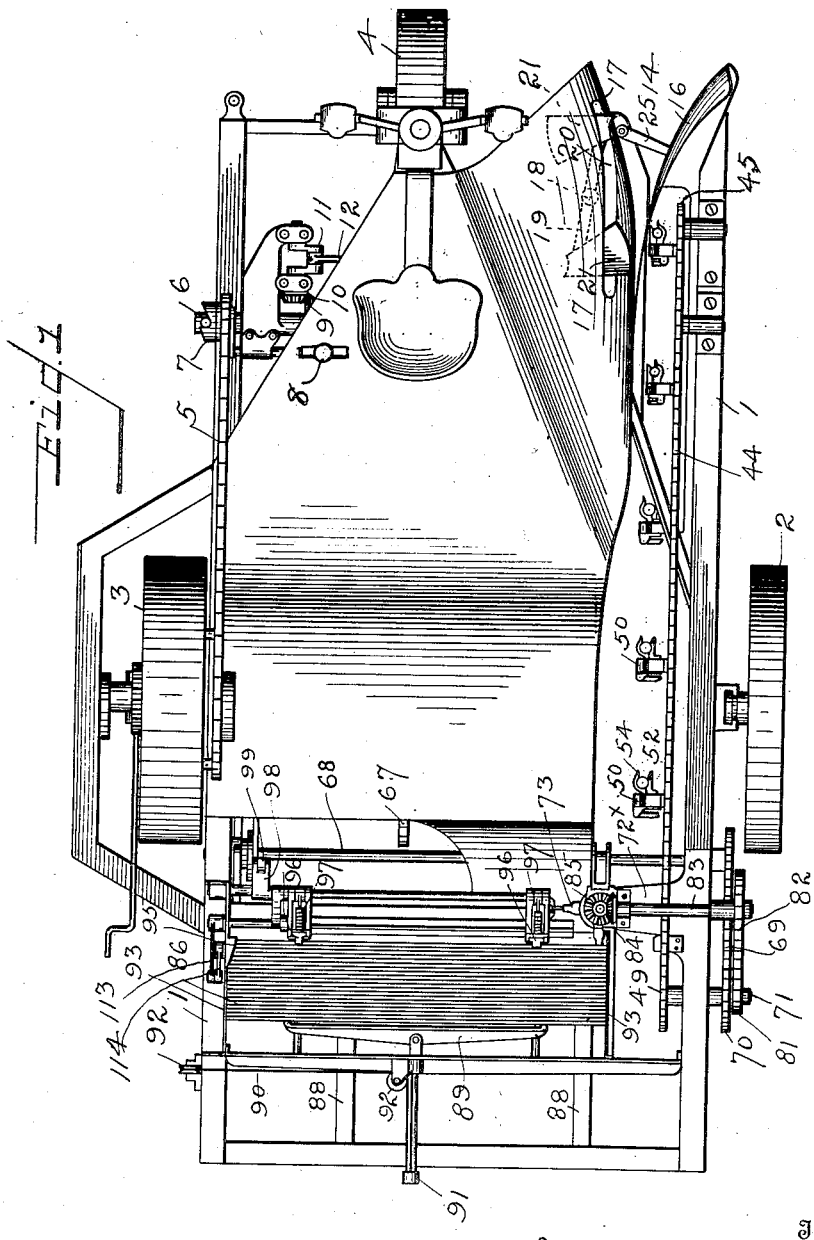

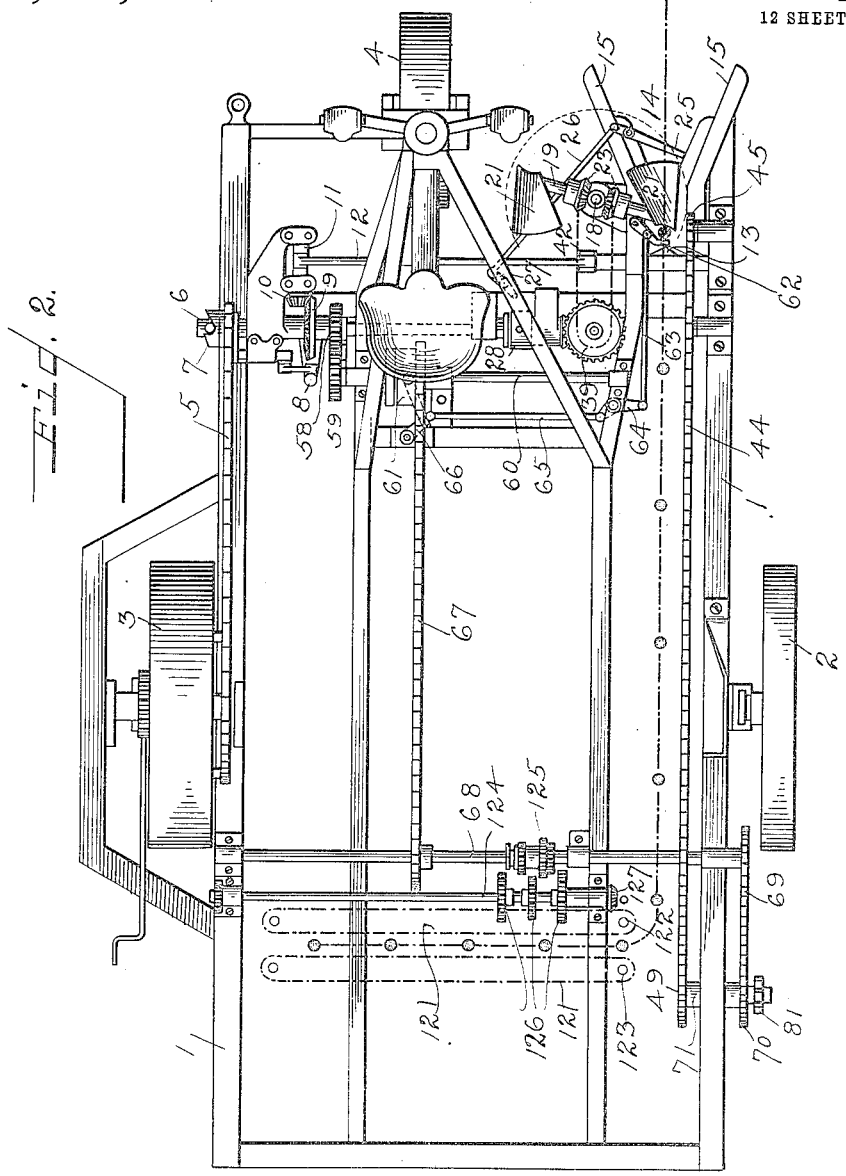

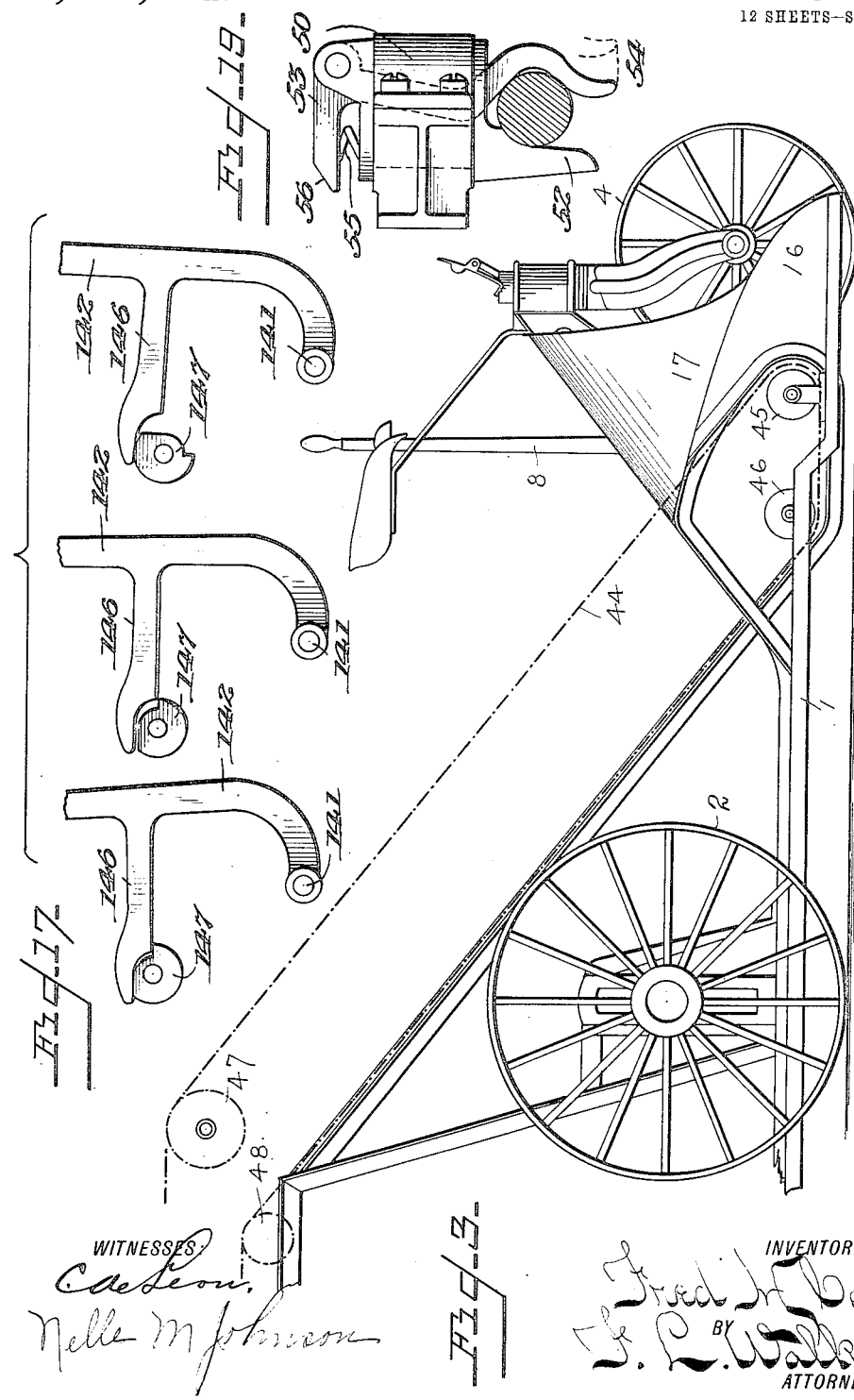

F. H. COOK.
TOBACCO HARVESTER.
APPLICATION FILED MAR. 17, 1911.
1,134,184.
Patented Apr. 6, 1915.
12 SHEETS—SHEET 4.
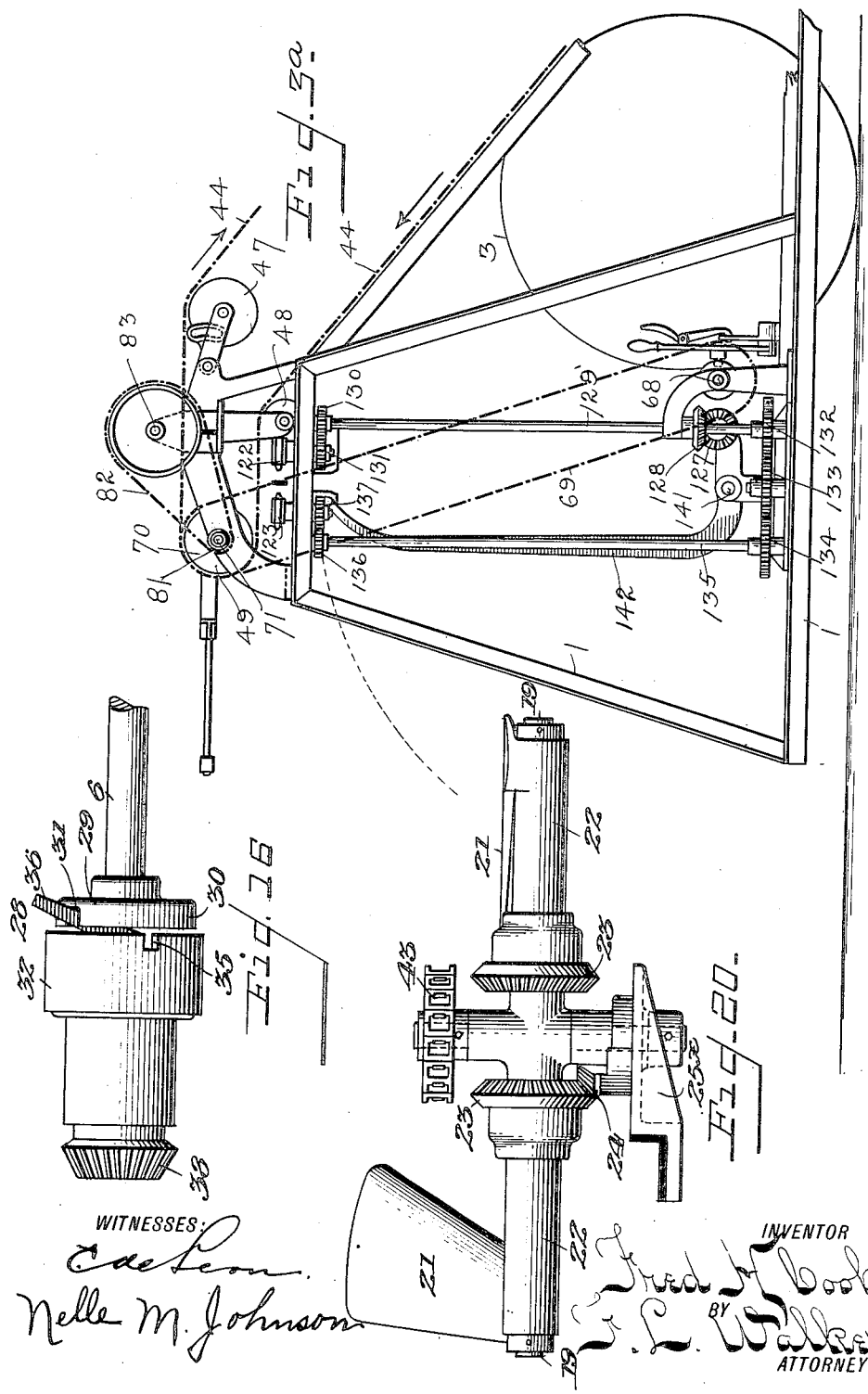

F. H. COOK.
TOBACCO HARVESTER.
APPLICATION FILED MAR. 17, 1911.

1,134,184.

Patented Apr. 6, 1915.
12 SHEETS—SHEET 5.

Witnesses

Inventor
Fred H. Cook
By F. L. Walker
Attorney

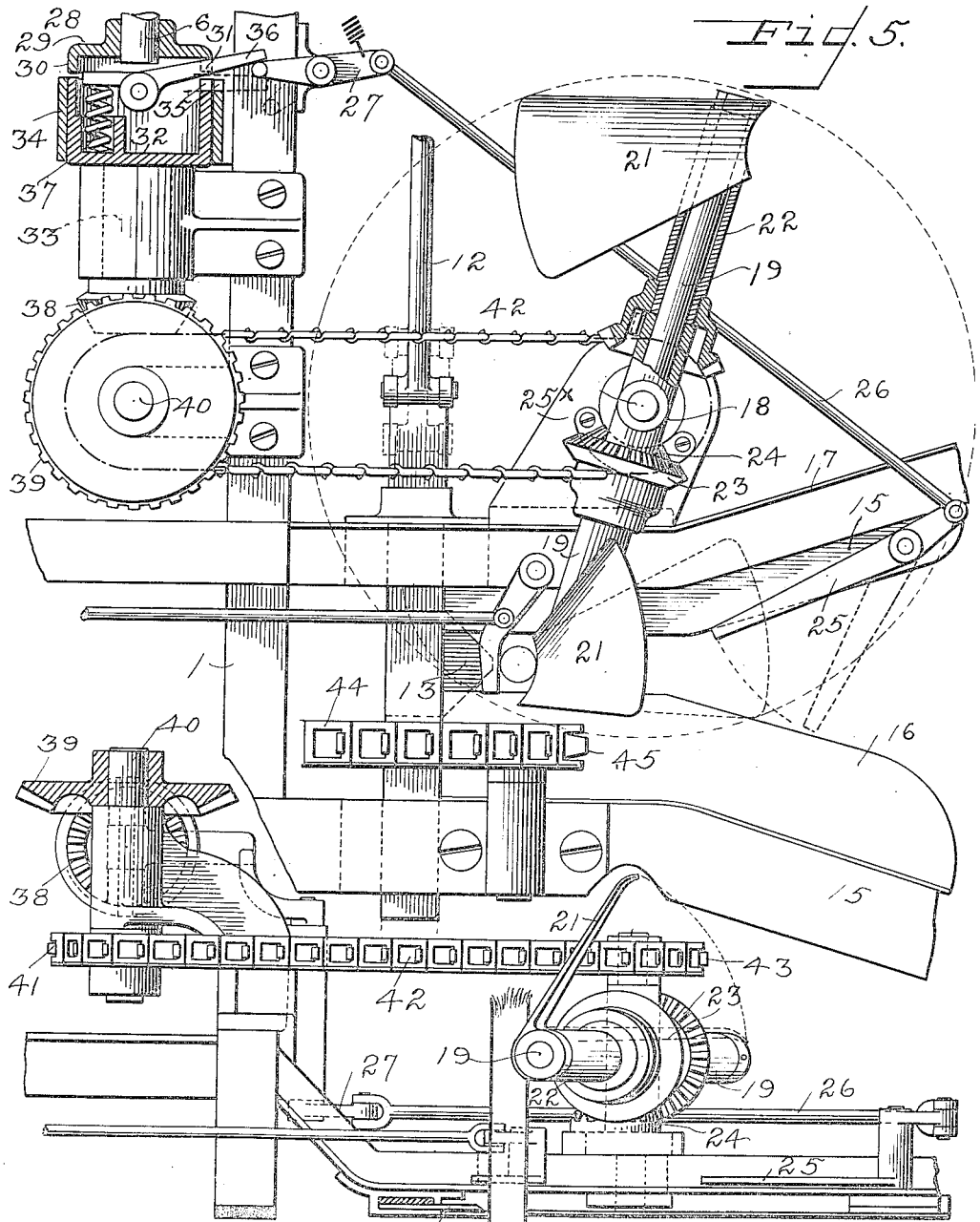

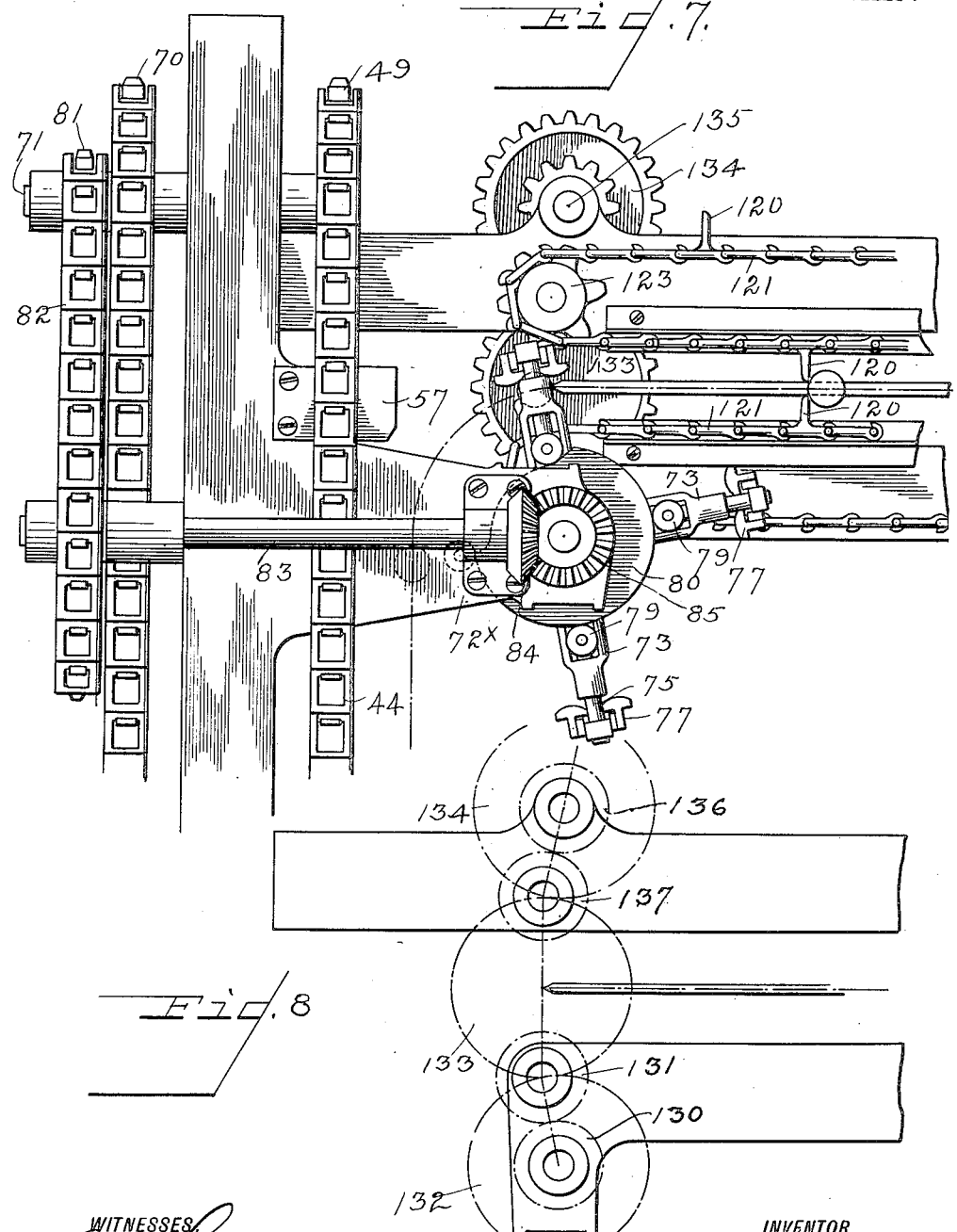

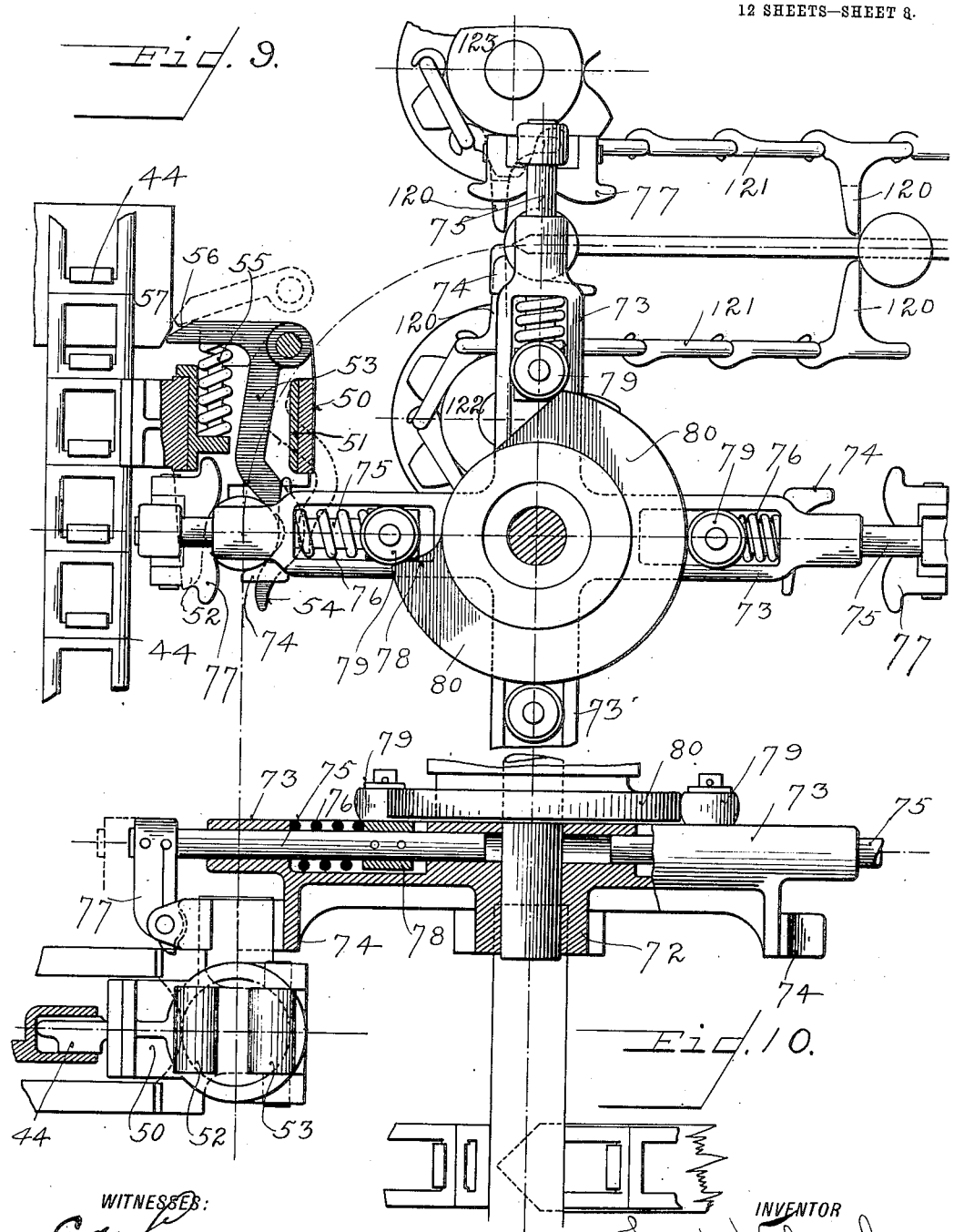

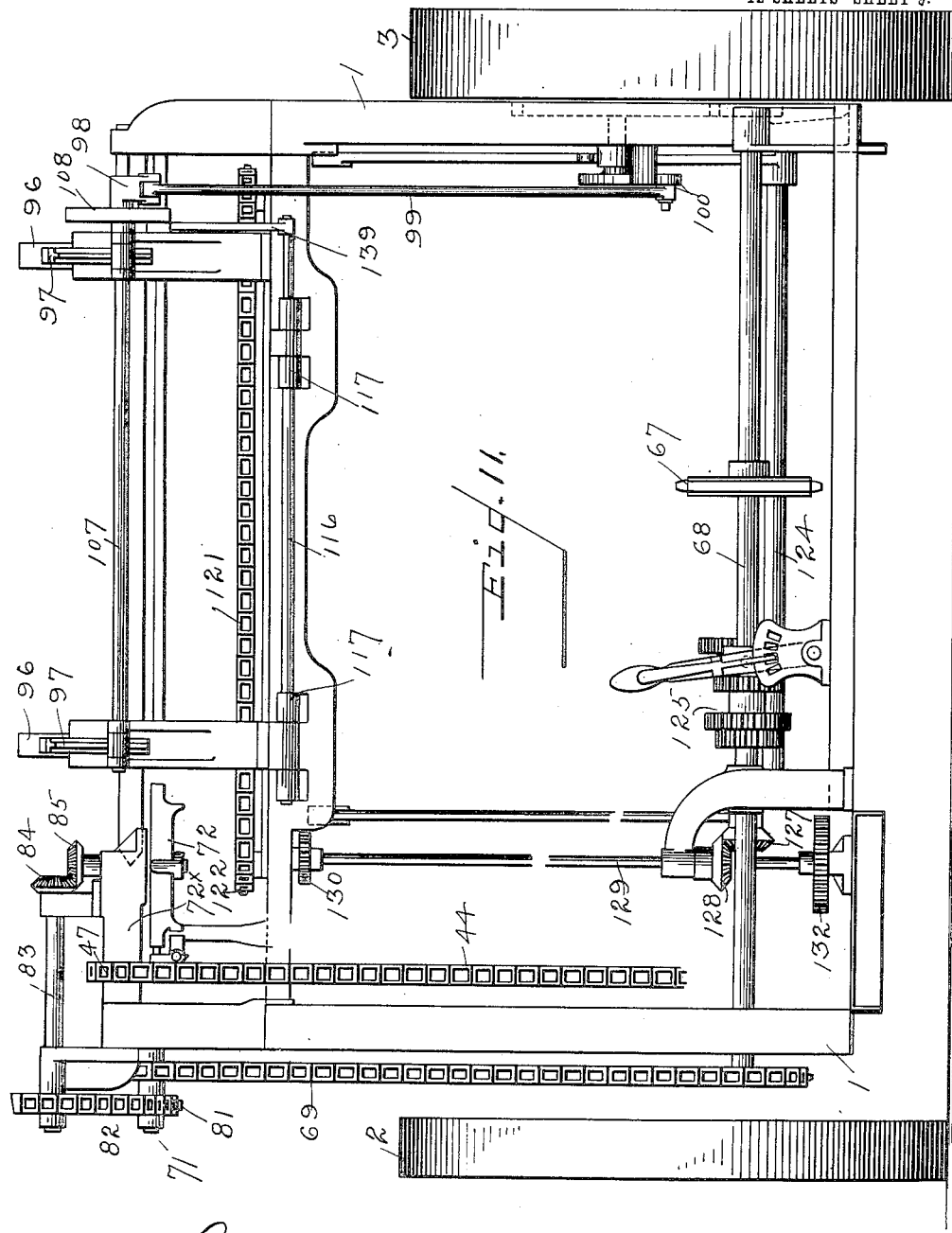

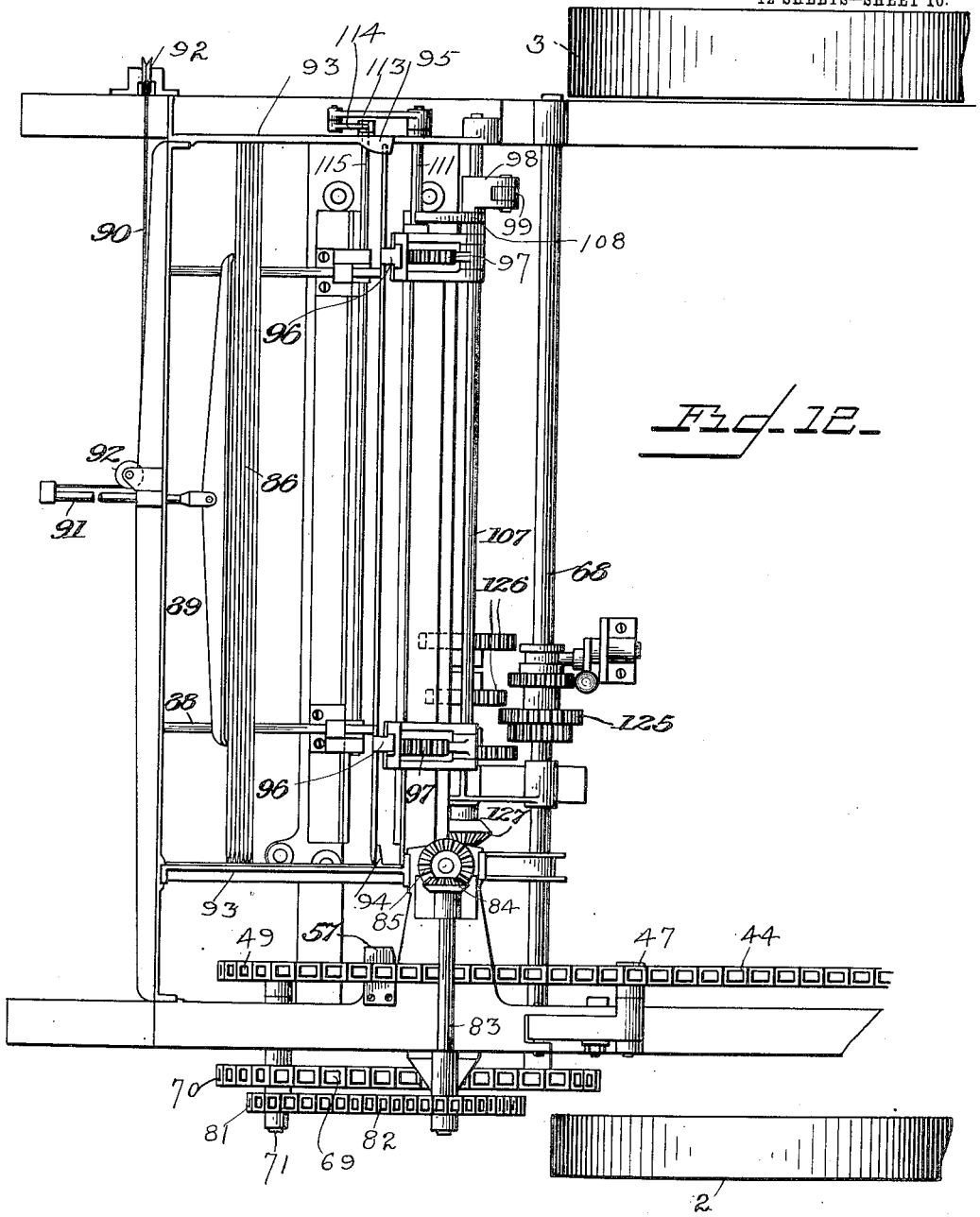

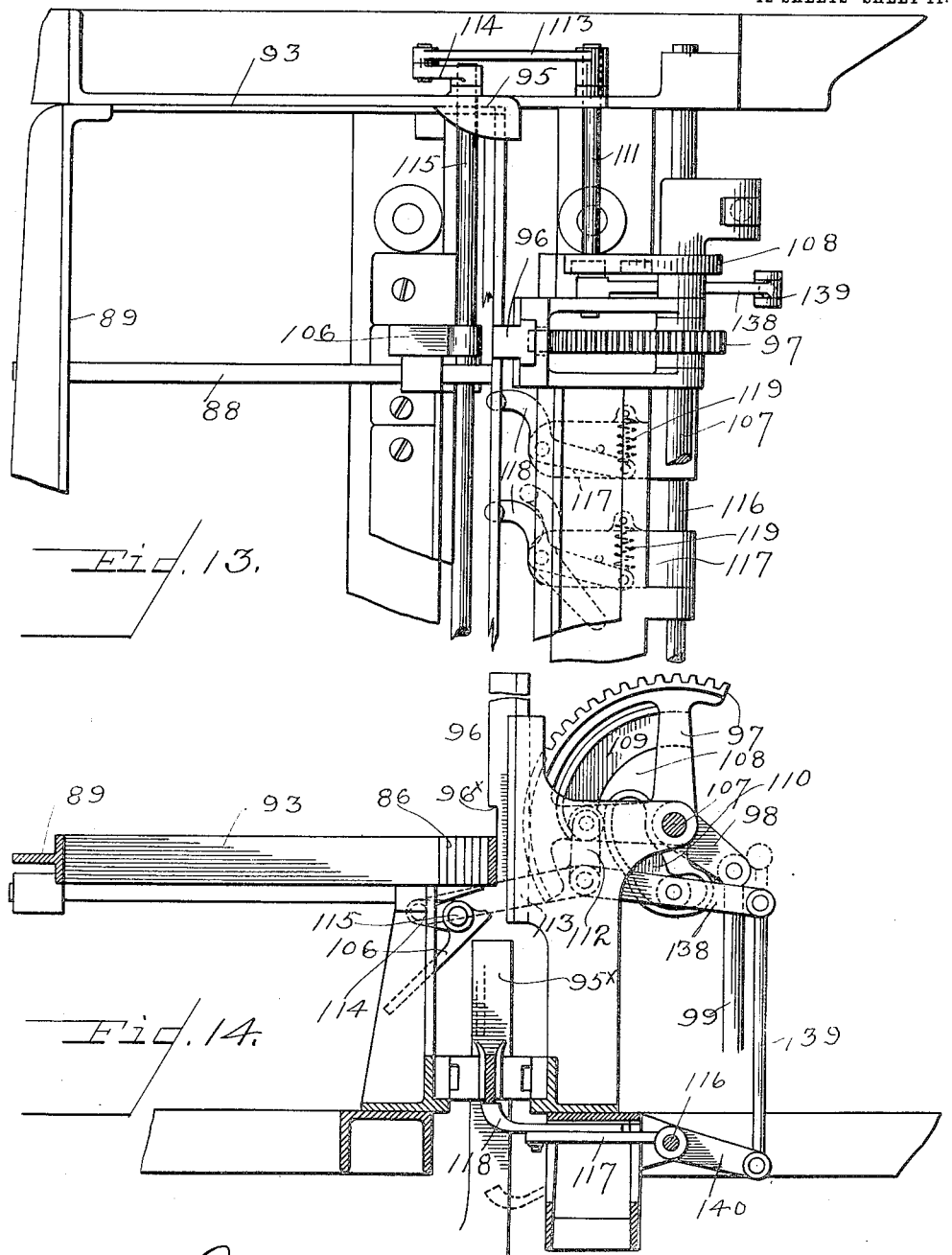

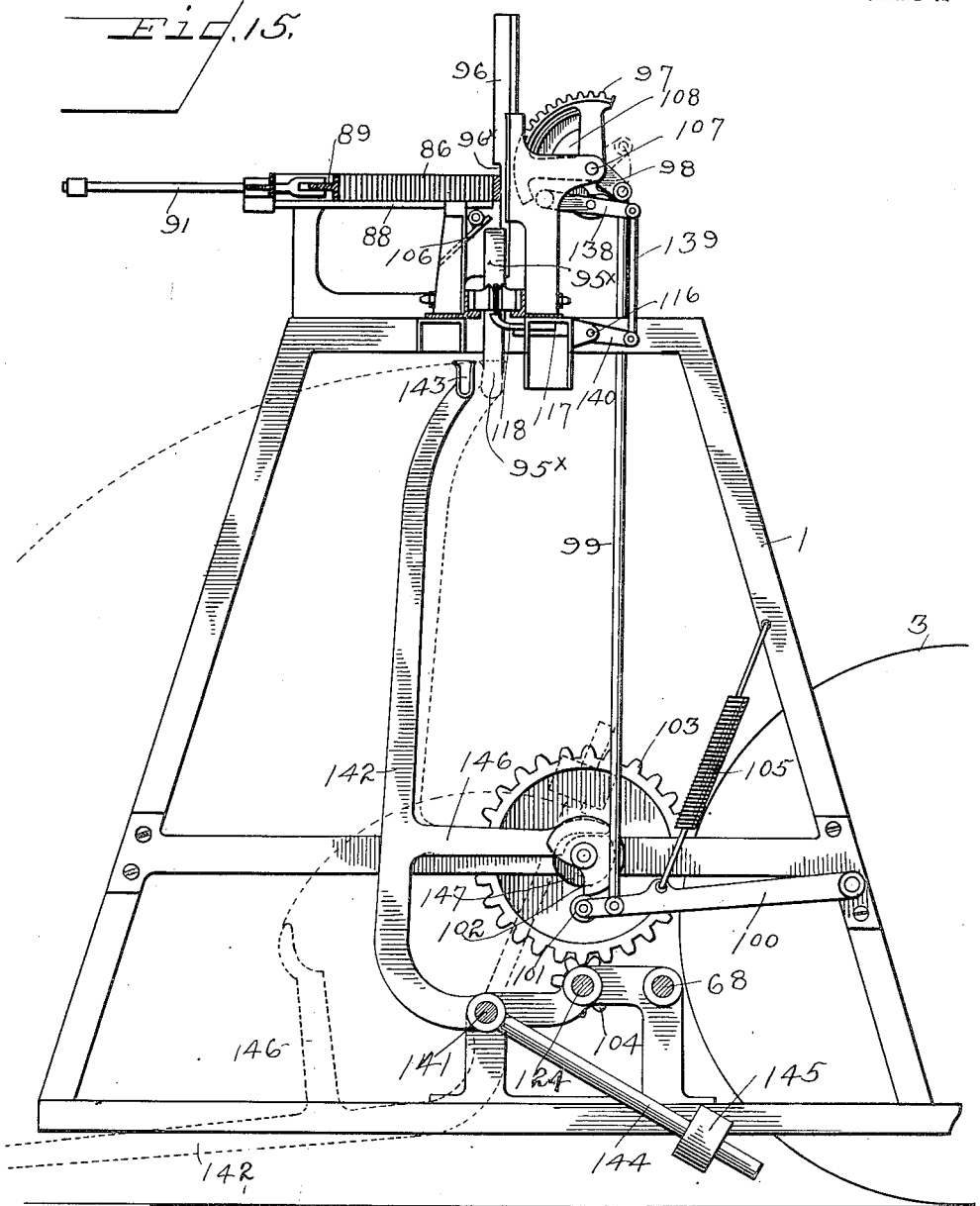

UNITED STATES PATENT OFFICE.

FREDERICK H. COOK, OF DAYTON, OHIO, ASSIGNOR OF ONE-HALF TO ROBERT N. KING, OF DAYTON, OHIO.

TOBACCO-HARVESTER.

1,134,184.  Specification of Letters Patent.  Patented Apr. 6, 1915.

Application filed March 17, 1911. Serial No. 615,060.

*To all whom it may concern:*

Be it known that I, FREDERICK H. COOK, a citizen of the United States, residing at Dayton, in the county of Montgomery and State of Ohio, have invented certain new and useful Improvements in Tobacco-Harvesters, of which the following is a specification.

My invention relates to harvesters, and particularly to machines for harvesting heavy or luxuriant growths, and is especially adapted for harvesting tobacco, but may be also used for harvesting other similar growths.

In harvesting tobacco it has heretofore been the custom to sever the growing stalks by hand, lay the severed stalks upon the ground to wilt and after the plant has sufficiently wilted, to gather the stalks and secure them upon supports or laths by hand, and thereafter suspend the laths with the plant in inverted position to dry or cure. This method of harvesting is very laborious and involves a great amount of hand labor and requires considerable time. The leaves of the tobacco plant are very tender and easily bruised or torn and any injury to the leaves materially decreases the value of the plant. The harvesting operation therefore requires great care and it is desirable that the plant be handled as little as possible, to avoid injury to the tender leaves.

The object of the present invention is to provide a machine automatic in its action, efficient in use, simple in construction, capable of being operated by an operator unskilled in the usual methods of harvesting tobacco, and unlikely to get out of repair.

A further object of the invention is to provide means for severing the growing stalk and for supporting the stalk during the severing operation and guiding it thereafter in such manner that the tender leaves will be fully protected and any possibility of injury thereto obviated.

A further object is to provide improved conveyer mechanism adapted to independently engage the severed stalks and convey them through a predetermined path of travel, and further to provide means for automatically engaging the severed stalks upon a movable support in predetermined spaced relation and to provide means for discharging the support and attached stalks when a predetermined quantity of stalks have been secured thereon.

With the above primary and other incidental objects in view, as will more fully appear in the specification, the invention consists of the features of construction, the parts and combinations thereof and the mode of operation or their equivalents as hereinafter described and set forth in the claims.

Figure 18:
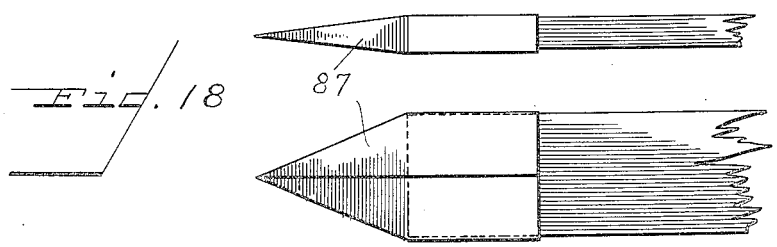

Referring to the drawings, Figure 1 is a plan view of the assembled machine. Fig. 2 is a detail plan view somewhat diagrammatic of the assembled machine, with the superstructure removed showing the various driving connections. Fig. 3 is a side elevation of the assembled machine, the rear portion thereof being broken away. Fig. 3ª is a continuation of Fig. 3 showing the rear portion of the machine, the view being somewhat diagrammatic. Fig. 4 is a front elevation of the assembled machine. Fig. 5 is a detail plan view of the severing mechanism, the follower devices which engage the stalks during the severating operation and the actuating mechanism therefor. Fig. 6 is a detail side elevation of the mechanism shown in Fig. 5. Fig. 7 is a detail plan view of the transfer mechanism and the means for engaging the severed stalks upon the supporting lath, and for distributing the stalks thereon in predetermined spaced relation. Fig. 8 is a diagrammatic plan view showing the driving connection of the various parts shown in Fig. 7. Fig. 9 is an enlarged detail plan view of the mechanism shown in Fig. 7, showing the conveyer mechanism and also the transfer mechanism, for transferring the severed stalks from the conveyer to the supporting lath and the spacing fingers adapted to locate the stalks in proper relation upon the lath. Fig. 10 is a side elevation partly in section of the mechanism shown in Fig. 9. Fig. 11 is a transverse sectional view looking toward the rear or from the right in Fig. 3ª. Fig. 12 is an enlarged plan view of the rear portion of the machine or that portion shown in Fig. 3ª. Fig. 13 is a detail plan view of the feeding mechanism for the movable supports. Fig. 14 is a sectional elevation of the parts shown in Fig. 13. Fig. 15 is a longitudinal sectional view through the rear portion of the machine illustrating the support feeding and discharging devices. Fig. 16 is a detail view of the non-repeating clutch, employed for intermittently driving the conveyer mechanism and also the follower mechanism. Fig. 17 is a detail view of the operating cam for the support discharging devices. Fig. 18 is a detail view of a modification of the supporting member or lath showing a removable sharpened head. Fig. 19 is a detail plan view of one of the elevator grippers engaging a stalk. Fig. 20 is a front elevation of the follower mechanism or stalk supporting devices.

Like parts are indicated by similar characters of reference throughout the several views.

In constructing the machine there is employed a main frame 1 supported on oppositely disposed carrying wheels 2 and 3 and a swivel guiding wheel 4 located at the front of the machine. The carrying wheel 3 constitutes the driving wheel from which the various actuating parts are driven by means of a sprocket chain or belt 5, connecting a sprocket upon the shaft of the carrying or driving wheel 3 with a corresponding sprocket located upon a transverse shaft 6 adjacent to the forward portion of the machine.

The main drive shaft 6 is adapted to be engaged or disengaged from the drive wheel 3 by means of a clutch 7 operated by a hand lever 8 in the usual manner. Thus the operating parts may be disconnected and remain at rest when it is desired to transport the machine from place to place. Carried upon the transverse drive shaft 6 is a beveled gear 9 meshing with a corresponding pinion 10 on the shaft of a crank 11. Carried by the crank 11 is a pitman 12 operating reciprocating severing devices 13 located in a throat 14 formed by the divergent arms 15 which project forward from the main portion of the frame.

The standing stalks entering between the arms 15 as the machine advances are guided to the severing devices 13. Carried by the arms 15 and extending rearward over a portion of the main frame are two guiding shields 16 and 17 of sheet metal or other material presenting a smooth continuous surface over which the leaves of the plant will ride without danger of injury or abrasion. The guiding shields 16 and 17 are curved throughout their length, the outermost shield 16 being inclined toward shield 17, while the guiding shield 17 is inclined away from the shield 16, thereby forming intermediate the shields 16 and 17 a curved or winding throat or passage which will cause the severed stalks conveyed therethrough to be gradually inclined from a perpendicular position. The inner shield 17 extends over the greater portion of the main frame as shown in Fig. 1 protecting the driving mechanism thereof and preventing the leaves of the severed plant from being caught in the moving parts and mutilated thereby. The innermost shield 17 also forms a support for the severed stalks over which they ride until lifted therefrom by the conveying mechanism as hereinafter described. Located adjacent to the innermost forward extending arm 15 and beneath the guide shield 17 is an intermittently operated follower mechanism, comprising a revoluble head 18 having oppositely extending arms 19 which are adapted to protrude through a slot 20 in the said guide shield 17 as the rotary head 18 revolves and engage the standing plant as it approaches the severing devices, to support the plant during the severing operation. Carried by each of the follower arms 19 is a scoop shaped guiding vane 21 secured upon a revoluble sleeve 22 journaled on the follower arm 19. Each of the sleeves 22 carries a gear member 23 adapted to engage a mutilated gear or rack member 24 secured to the supporting bracket 25$^x$ in which the rotary follower head 18 is mounted. The normal position of the guiding vane 21 is horizontal; however after the rotary head 18 has been revolved to the point where the follower arms 19 emerge from the slot 20 of the guiding shield 17, the gear member 23 of the sleeve 22 will engage the rack 24 before mentioned, and will cause a partial rotation of the sleeve 22, oscillating the guiding vane 21 from a horizontal position to a substantially vertical position as shown in Figs. 5 and 6. The erection of the guiding shield 21 occurs just prior to the engagement of the stalk by the severing devices, whereby the guiding shield will be in position to support the stalk during the severing operation, and by the advance movement of the follower arms will deflect the stalk, after being severed onto the guiding shield 17.

In the drawings the head 18 has been shown as provided with two follower arms 19, but it is to be understood that additional follower arms may be provided, or that a single arm may be employed in which case the speed of rotation of the head 18 will be accordingly modified. The follower mechanism just described is intermittently actuated, being operated only at time when the stalk is about to be severed. The mechanism for driving the follower devices is set in motion by the standing stalk engaging a trip arm 25 normally projecting across the throat 14 and adapted to engage the standing stalk as the machine advances, and to be oscillated thereby. To the trip member 25 is connected a link 26 attached at its opposite end to a lever 27 adapted to operate a cluch member 28.

The clutch 28 may be of any desired construction but is preferably of the nonrepeat type, whereby the clutch will automatically disconnect after having made a predetermined rotation. As shown in the drawings the nonrepeat clutch 28 comprises a disk 29, having a peripheral flange 30 provided with a notch 31, the disk 29 being mounted on the drive shaft 6. The corresponding clutch member comprises a housing 32 mounted upon the driven shaft 33 rotating within a collar or sleeve 34, the housing and sleeve having in the edge thereof registering notches 35. Pivoted within the housing 32 is the clutch member 36 spring pressed away from the disk 29 and normally resting in the notches 35 of the housing 32 in the collar 34. Upon the engagement of the trip lever 25 with the standing stalk, the lever 27 will be operated to disengage the clutch member 36 from the notches 35 of the housing 32 and collar or sleeve 34 and move said clutch member 36 into engagement with the notch 31 of the disk 29. Upon engagement of the clutch member 36 with the disk 29 carried upon the drive shaft 6, the housing 32 and therewith the driven shaft 33 will be carried in unison with the drive shaft 6, the clutch member 36 engaged in the notch 31 of the disk 29 and riding upon the edge of the collar 34 until it has made one complete rotation, at which times the spring 37 tending to oscillate the clutch member 36 away from the disk 29, will cause said member to return to engagement with the notch 35 upon the clutch 36 reaching such point in its rotation. Thus it will be seen that the driven member 33 will be rotated through one complete revolution at each operation of the clutch 28, and furthermore that operation of said clutch 28 depends upon the engagement of the machine with the standing stalk to be harvested. The driven shaft 33 carries a beveled pinion 38 meshing with a corresponding gear 39 located upon a vertical shaft 40 upon the lower end of which is carried a sprocket wheel 41, over which passes a drive chain 42 engaging a corresponding sprocket 43 upon the shaft of the revoluble follower head 18, this construction is clearly shown in Figs. 5 and 6, and constitutes the intermittently operating mechanism of the follower devices.

By causing the standing stalk to trip the clutch mechanism as before described to operate the follower devices, the operation of said devices will be properly timed in relation to the stalks to be harvested, regardless of their intervals or regularity of the spacing in the rows.

After having been severed by the reciprocating severing devices 13 and deflected laterally upon the guiding shield 17 by the guiding vanes 21 of the follower devices, the stalk is engaged by gripper devices carried upon an elevating chain 44. The elevator chain is located at the right hand side of the machine, and extends adjacent to the throat 14 through which the stalks enter to the severing devices. The elevator chain passes over sprockets 45 and 46 located on the lower forward portion of the machine, from which it extends upward and rearward as shown in Figs. 3 and 3ª, passing over idler sprockets 47 and 48 at the upper rearward portion of the machine, and thence over the drive sprocket 49. The conveying chain 44 carries a plurality of gripper members adapted to independently engage each of the severed stalks and convey them upward and rearward toward the rear of the machine. Located at intervals upon the elevator chain 44 is a series of lugs each formed into a collar or sleeve 50, the axis of which is substantially in alinement with the path of travel of the chain or elevator 44. Revolubly mounted in each of the collars or sleeves 50 is a second sleeve or barrel 51 from which projects an integral or rigid finger 52.

Pivotally supported upon a suitable lug carried by the sleeve or barrel 51 is a bell lever 53 terminating at its extremity in a curved gripper member 54. The bell lever 53 is spring pressed by a spring 55 toward a stationary finger 52 as clearly shown in Fig. 9. The lateral arm of the bell lever 53 is provided with a cam face 56 adapted to engage corresponding cam members 57 located at predetermined points upon the main frame 1. Upon engaging the cam 57 upon the main frame as the gripper member is carried past said cam by the traveling chain, the bell lever 53 is oscillated to separate the gripper fingers 52 and 54 whereby they may either engage or release the severed stalk. Such separation of the gripper fingers 52 and 54 places the spring 55 under tension, whereby said spring will tend to close the gripper fingers, upon disengagement of the cam face 56 with the cam 57. The bell lever 53 and the gripper fingers 52 and 54 being carried by the sleeve or barrel 51, which is journaled in the collar 50 are revoluble in their relation to the chain 44. The guiding sprocket 45 over which the elevator chain 44 passes is located slightly forward of the severing devices 13, whereby the gripper members carried by the elevator chain 44 will engage the stalk at the time the stalk is being severed by the devices 13.

As the severed stalk is deflected by the guiding vane 21 and the winding formation of the throat 14 due to the curvature of the guiding shields 16 and 17, the sleeve or barrel 51 of the gripper member oscillates within the sleeve or collar 50 to compensate for such movement of the severed plant. It is to be understood that one of the cam members 57 is so located on the frame that it will cause the gripper fingers 52 and 54 to be opened to engage the stalk as the stalk is being severed by the devices 13, and as the gripper member advances it will disengage the cam 57 whereupon the spring 55 will cause the fingers 52 and 54 to securely grip the stalk of the plant. As the gripper member travels upward and rearward with the elevator chain 44 the stalk is lifted from the guiding shield 17, the sleeve or barrel 51 in the meantime rotating to compensate for the different positions of the stalk in relation to the elevator chain, until the stalk is suspended in a substantially vertical position, in which position it is conveyed upward and rearward from the guiding shield 17 to the point where it is disengaged from the conveyer mechanism as hereinafter described. Like the follower mechanism herein before described, the elevator mechanism is intermittently operated and such operation thereof is controlled by the engagement with the machine of the standing stalk to be harvested.

Carried upon the drive shaft 6 adjacent to the gear pinion 59 is a second gear pinion 58 meshing with the corresponding pinion 59, located on the driving portion of the countershaft 60, transversely arranged upon the main frame to the rear of the shaft 6. The drive portion of the countershaft 60 is adapted to be intermittently engaged with the driven portion thereof by a nonrepeat clutch 61 corresponding to the clutch 28 before described. After having engaged and operated the trip lever 25 before mentioned and just before being engaged by the severing devices 13 the standing stalk engages and oscillates a second trip lever 62 connected by a link 63 with a bell lever 64, which in turn is connected by a link 65 with an operating lever 66 adapted to cause the engagement of the nonrepeat clutch 61, by which the elevating mechanism is intermittently actuated. Carried upon the driven portion of the countershaft 60 is a sprocket engaged by a sprocket chain 67 adapted to drive a transverse shaft 68 adjacent to the rear of the main frame. See Fig. 2.

At the extremity of the transverse shaft 68 and beyond the main frame is carried a sprocket wheel over which travels a sprocket chain 69 extending rearwardly and upwardly and driving a sprocket wheel 70 mounted upon a short shaft or trunnion 71 which carries at its opposite end the driving sprocket 49, of the elevator chain 44. The elevating mechanism and driving connections thereof are best illustrated in Figs. 2, 3 and 3ª.

As the severed stalks approach the upper rearward limit of the path of travel of the elevator chain 44, they are disengaged from the gripper devices of the elevating mechanism and transferred through an arcuate path to a suitable supporting member hereinafter described, by revoluble transfer mechanism. The transfer mechanism comprises a revoluble head 72 supported in a pendant position from an inward projecting arm 72ˣ carried on the main frame, as particularly shown in Fig. 10. The revoluble transfer head 72 is provided with a plurality of radial arms 73 each of which carries a downward projecting lip or lug 74, which forms a stationary gripper jaw. Slidingly mounted in each of the radial arms 73 is a reciprocating member 75, spring pressed inward by a helical spring 76 and carrying on its outer extremity a downward projecting gripper jaw 77, movable to and from the stationary gripper jaw 74, by the reciprocatory movement of the member 75. Secured upon each of the reciprocating members 75 is a bearing block 78 upon which is journaled a roller 79. As the transfer head 72 rotates the rollers 79 of each of the reciprocatory members 75 located on the rotating arms 73, ride upon the irregular periphery of the stationary cam 80 carried upon the inward projecting arm 72ˣ. The engagement of the rollers 79 with the irregular periphery of the cam 80 causes the respective sliding members 75 to be reciprocated, at predetermined points in the rotation of the head 72, against the tension of the helical spring 76, thereby distending or opening the gripper jaws 77 and 74.

The rotation of the transfer head 72 is so timed that the gripper jaws 77 and 74 will register with the gripper fingers 52 and 54 of the elevator mechanism, and the cam 80 is so located in relation to the rotary transfer head 72 that the gripper jaws 77 and 74 will approach the point of registry with the gripper fingers 52 and 54 in distended or opened position, ready to engage over the upturned end of the severed stalk at which time the rollers 79 will pass off of the shoulder cam 80 and the helical spring 76 will reciprocate the member 75 to cause the gripper jaws 77 and 74 to close upon the extremity of the severed stalk. At the moment of engagement of the severed stalk by the jaws 77 and 74 of the transfer device the cam face 56 of the bell lever 53 will engage the cam member 57 oscillating said lever which will cause the gripper fingers 52 and 54 of the elevating mechanism to disengage the stalk leaving it suspended from the gripper jaws 77 and 74. The elevator chain 44 is driven at a greater linear speed than the rotary transfer head 72, therefore the gripper fingers 52 and 54 upon their disengagement from the severed stalk will be carried away from the stalk and out of the path thereof. Thus the severed stalk is left suspended from the radial arms of the rotary transfer head 72, by which it is carried through an arcuate path to the support or lath waiting to receive it as hereinafter described. The rotary transfer head is driven from the sprocket 81, carried on the transverse rotary stud or trunnion 71 common to the sprockets 70 and the elevator driving sprocket 49, by a sprocket chain 82 engaging a sprocket upon a transverse countershaft 83 mounted in suitable bearing on the main frame. The countershaft 83 carries at its inner extremity a beveled pinion 84 meshing with a similar pinion 85 upon the upper end of the vertical shaft of the rotary transfer head 72. The driving connections of the rotary transfer head 72 are best shown in Figs. 7 and 10, while the detail construction of the rotary transfer head is best shown in Figs. 9 and 10.

Located upon the upper rear portion of the main frame is a magazine or container for a supply 86 of supporting members or laths sharpened at one end, or provided with a removable sharpened head as shown in Fig. 18, and adapted to be projected singly into the path of the severed stalk carried by the rotary transfer head 72 whereby the severed stalk will be impaled upon the sharpened point of said lath or support. The supporting members or laths may be either of wood or of metal pointed at the receiving end to more readily pierce the stalk or they may be provided with interchangeable pointed spear heads 87 as shown in Fig. 18.

The location of the magazine for the laths or supports is best shown in Fig. 1 while an enlarged detail plan view thereof is shown in Fig. 12. The feeding mechanism for the laths or supports is shown in detail in Figs. 13 and 14.

The series of independent pointed laths forming the supply 86 are arranged in transverse position and rest upon longitudinal bars 88. As each successive lath is fed from the magazine or receiver by the means herein after described, the remaining laths or supports are advanced toward the discharged point of the receiver by a follower head 89 which may be spring actuated but is preferably actuated by means of a cable 90 attached to the rearward projecting arm 91 carried by said follower head, the cable 90 passing over pulleys 92 and carrying at its extremity a weight not shown in the drawings.

The side members 93 of the support magazine are provided with inward projecting lugs 94 and 95 which limit the forward movement of the supports within the magazine or container. The lug 95 located at the left side of the machine is hooded to prevent vertical displacement of the vertical supports or laths while in engagement therewith and immediately below said lug is provided an abutment 95× for the supports or laths during the impaling process by which the severed stalks are secured thereon. The longitudinal bottom bars 88 upon which the supports or laths are carried within the magazine terminate in a plane adjacent to the inward projecting lugs 94 and 95 leaving sufficient space through which the lath or support in engagement with the lugs 94 and 95 may be projected downward from the magazine and past the ends of the supporting bars 88. Located adjacent to the forward portion of the magazine, in position to engage the foremost support or lath therein and eject it from said magazine through a downward path into position to receive the advancing stalks are two vertically moving plungers 96 offset or shouldered as at 96× to engage the lath or support. These vertical plungers 96 are mounted in suitable ways on the main frame and are operated by means of a gear sector 97 engaging corresponding gear rack formed on the plungers 96. The gear sector 97 is provided with a rock arm 98 engaged by a downward projecting link 99 connected at its opposite end to a lever 100 pivoted to the main frame of the machine as shown in Fig. 15. The lever 100 carries at its extremity a roller 101 engaging a cam 102 adapted by its rotation to oscillate the lever 100. The cam member 102 is rotated by means of a gear 103 mounted on the shaft common with said cam and driven by a pinion 104 carried on the extremity of the transverse drive shaft 124 located in the rear lower portion of the machine. A retracting spring 105 is provided for the lever 100 which is adapted to maintain said lever 100 in engagement with the irregular periphery of the cam 102. As the lever 100 is oscillated by means of the retracting spring 105 upon the rotation of the cam 102, the lever operates through the link 99 to oscillate the gear sector 97, thereby causing a downward movement of the ejector plungers 96 the shoulders of which engage the foremost support or lath within the magazine and carry it downward therefrom. Pivotally supported beneath the support magazine are swinging guard plates 106 movable to and from the reciprocating plungers 96 and adapted to be moved into parallel relation therewith upon the downward movement of said plungers to form a guide or chute to direct the movement of the support or lath during its passage from the magazine. The swinging plate 106 will form one side of such chute or guide way, while the vertical plunger 96 will form the opposite side thereof.

Referring particularly to Figs. 13 and 14 there is mounted on the shaft 107 upon which is carried the gear sectors 97, a cam member 108 having two irregular cam grooves therein 109 and 110. This cam member 108 being carried upon the shaft 107 oscillates in unison with the gear sectors 97. Journaled in the main frame is a rock shaft 111 carrying at one end thereof a rock arm 112 engaging the cam groove 109 of the cam member 108. At its outer extremity the rock shaft 111 carries a rock arm 113 pivotally connected to a second rock arm 114 secured upon a rock shaft 115, upon which is rigidly carried the swinging guide members 106. Thus upon the oscillation of the shaft 107 by means of the lever 100 and the link 99 as before described, the cam member 108 carried therewith will cause an oscillatory movement of the rock arm 112 which engages in the cam groove 109 thereby rocking the shaft 111 and the arm 113 which through its engagement with the rock arm 114 will cause a corresponding oscillation of the shaft 115 carrying with it the guide members 106 which will be thereby moved to a parallel position in relation to the plungers 96, as shown in dotted lines in Fig. 14. Such oscillation of the shaft 107 and gear member 97 will also cause a reciprocation of the ejector plungers 96, which moving downward will carry the foremost support or lath within the magazine with them through the throat or passage way formed intermediate the guiding members 106 and said vertically moving plungers 96. The lath thus ejected from the magazine will be carried into the path of the advancing severed stalks and will be held stationary therein while a plurality of the stalks are engaged upon said lath or support as hereinafter described.

In order to support the lath in position to receive the stalks there is provided a transverse rock shaft 116 located below the shaft 107 having rock arms or plates 117 carried thereon, to each of which rock arms or plates 117 there is pivoted an oscillating finger 118 upon which the lath or support may rest. These fingers 118 normally project into the path of the lath or support as it is carried from the magazine, and into that of the advancing stalks, but are adapted to be oscillated out of such path through a horizontal plane of oscillation against the tension of their retracting springs 119 to permit the passage of the severed stalks which have been impaled upon the lath or support. There are a plurality of the rock arms or plates 117 carried upon the shaft 116 and all such plates 117 operate in unison upon the oscillation of the shaft 116. However the supporting finger 118 carried upon each of the rock arms or plates 117 may be oscillated independent of each other against the tension of their individual springs 119. The lath or support resting upon the movable fingers 118 is now in position to receive the severed stalks which are impaled thereon and are afterward distributed at regular intervals throughout the length of the support or lath. The severed stalks being carried from the elevator mechanism by the gripper jaws 77 and 74 of the radial arms 73 carried by the rotary transfer head 72 are pressed upon the sharpened point of the support or lath by the action of said rotary arms 73 causing the sharpened point of the lath to pierce the stalk which is firmly held by the gripper jaws 77 and 74 until after it has been pierced by the support. The piercing or impaling operation is assisted by means of lugs or fingers 120 carried by traveling chains or belts 121 arranged parallel with and on opposite sides of the stationary support or lath, as shown in Figs. 7 and 9. The pusher or spacing fingers 120 passing around the drive pulleys 122 and 123 engage the rear side of the stalk and by their advance movement force the stalk upon the sharpened point of the support, thus assisting the gripper jaws 77 and 74 of the transfer mechanism which maintain their engagement with the stalk until after the stalk is impaled upon the support. After the stalk has been secured upon the support the rollers 79 of the reciprocatory member 75 of the transfer mechanism rides over the inclined surface of the cam 80 which reciprocates the member 75 to cause the disengagement of the jaws 74 and 77 from the severed stalk, which is left impaled upon the support while the transfer head 72 rotates the succeeding radial arms 73, bringing other stalks from the elevator mechanism to the support or lath. After the stalks have been impaled upon the lath or support and the gripper jaws 74 and 77 of the transfer devices are disengaged therefrom the stalk is slidingly adjusted on the support by the advancing pusher or spacing fingers 120, which project inward from either side, engage behind the stalk and as the chains 121 travel about their driving sprockets the stalk is advanced upon the support. When a predetermined number of stalks have been secured upon the lath or support the lath is discharged from the machine and another lath is fed downward from the magazine into the path of travel of the stalks as before mentioned.

In order to drive the pusher or spacing fingers 120 at proper intervals there is provided in the main portion of the machine immediately back of the transverse shaft 68 a second transverse shaft 124. This shaft 124 is driven by means of gear pinions from the shaft 68. In the drawings a variable speed mechanism comprising a series of shifting or sliding gears 125 is shown, the various gears of which may be engaged by the sliding or shifting movement with one of the gears 126 mounted upon the transverse shaft 124, thereby providing means whereby the shaft 124 and the pusher fingers 120 and the support discharge devices to be hereinafter described, may be operated at different rates of speed. At the right extremity of the transverse shaft 124 is carried a beveled pinion 127 meshing with a corresponding pinion 128 mounted upon a vertical shaft 129 journaled in the main frame. At its upper extremity the shaft 130

129 carries a gear pinion 130 meshing with a similar pinion 131 mounted upon the lower extremity of the trunnion or shaft of the driving pinion 122 of one of the belts or chains 121 carrying the pusher or spacing fingers 120. This construction is best shown in Fig. 3ª. At its lower extremity the vertical shaft 129 carries a gear 132 meshing with an idler gear 133 mounted upon the main frame which in turn drives a third gear 134 carried upon the lower extremity of a second vertical shaft 135. The vertical shaft 135 carries a gear pinion 136 corresponding to the gear pinion 130 of the shaft 129. The gear pinion 136 meshes with a pinion 137 carried upon the lower extremity of the vertical trunnion or shaft of the drive sprocket 123 carrying the other of the endless chains or belts 121 upon which is supported the second series of pusher or spacing fingers 120. The transverse shaft 68 being intermittently operated from the countershaft 60 by means of the non-repeat clutch 61, it will be obvious that the shaft 124 and the vertical shafts 129 and 135 will also be intermittently operated, thereby driving the pusher fingers 120 through a step by step movement. The lath or support feeding mechanism hereinbefore described and the lath or support discharging mechanism to be hereafter described, being both operated from the transverse shaft 124 by means of the gear pinion 104 mounted upon the left hand extremity thereof, will be operated in proper time with the pusher fingers 120. It will also be obvious that the speed of the said devices, that is the pusher fingers, the support feeding devices, and the support discharging devices, may be varied in relation to the remainder of the operating parts by adjustment of the sliding or variable driving mechanism 125. As the severed stalks are slidingly adjusted to their predetermined position along the support or lath the stalks successively engage the pivoted supporting fingers 118, the said fingers yielding against their springs 119 to permit the passage of the stalk along the lath. There being a plurality of the yielding fingers 118 engaging and supporting the lath, which fingers are operated independently of each other, there will always be sufficient number of such fingers engaging and supporting the lath while other fingers are yielding to permit the passage of the stalks thereon. When a predetermined number of severed stalks have been impaled upon the lath or support and have been shifted thereon by means of the pusher fingers 120 to the predetermined spaced relation, the supporting fingers 118 are simultaneously withdrawn from engagement with the lath or support to permit the discharge thereof and another support or lath is simultaneously ejected from the magazine or receiver into position to receive the oncoming stalks. Pivotally supported on the main frame of the machine adjacent to the cam member 108 is a lever 138 having a stud or roller engaging in the cam groove 110 of the said member 108. Connected to the extremity of the lever 138 is a link 139 engaging at its opposite extremity a rock arm 140 carried on the rock shaft 116 upon which are supported the rock arms 117 and the yielding fingers 118. The initial movement of the cam 108 upon the oscillation of the shaft 107 necessary to cause the gear sectors 97 to operate the plungers 96 to eject the next support or lath from the magazine, causes an oscillatory movement of the lever 138 which is transmitted through the link 139 and the rock arm 140 to the rock shaft 116, thereby oscillating the rock arms or plates 117 upon which are pivoted the yielding fingers 118, to withdraw the said fingers 118 from beneath the lath or support which being weighted by the severed stalk will move downward by gravity out of the path of the next succeeding lath which is being carried down by the ejector plungers 96.

If the support or lath with the severed stalks impaled thereon should not move readily upon the withdrawal of the supporting fingers 118 the next succeeding lath being pressed downward by the ejectors 96 will engage the upturned ends of the stalks and will push the support and stalks carried thereon downward and out of its path. The oscillation of the shaft 107 to cause the feeding of the next succeeding support or lath and the withdrawal of the support or lath upon which the severed stalks have been impaled is caused by the oscillation of the lever 100 and the link 99 before described as shown in Fig. 15. The relative proportion of the gear pinion 104 and the gear 103 by which the cam 102 is rotated, thereby controlling the movement of the lever 100, is such that the support ejecting mechanism will only be operated after a predetermined number of stalks have been engaged upon the supports. Journaled in suitable bearings on the main frame and to the rear of the transverse shaft 124 is a rock shaft 141 forming a part of an oscillating frame including the swinging arms 142 located at each side of the machine having notches or recesses 143 in its upper extremities adapted to receive the loaded support or lath and convey the lath or support and the severed stalks attached thereon through an arcuate path and deposit them upon the ground to the rear of the machine. The said swinging discharge frame comprising the arms 142 is counterbalanced by a weighter arm 144 carried upon the transverse shaft 141, the weight 145 of which is adjustable thereon. One of the swinging arms 142 is provided with an inward projecting arm 146 engaging a cam 147 located on the shaft of the cam 102 and gear 103 which by its engagement with the arm or finger 146 is adapted to oscillate the frame member 142 through a limited path of travel. As the cam 147 rotates and simultaneously with the operation of the support ejector mechanism controlled by the cam 102, the cam 147 permits the swinging frame members 142 to advance under the influence of the weighted arm 144 until the notches or recesses 143 will extend into the path of the loaded support or lath as it drops downward from between the pusher fingers 120 upon the withdrawal of the supporting fingers 118. As the loaded support moves downward the opposite extremities thereof engage the recess or notches 143 of the arm 142 whereby the supports and the stalks attached thereto will be carried solely by the swinging frame members 142 independent of the other portions of the machine. At this time the cam member 147 by its engagement with the arm 146 tends to oscillate the swinging frame members 142 slightly rearward, whereupon the weight of the support and the severed stalks thereon carried by the swinging frame members 142 will overbalance the weighted arm 144 and the frame with the support and attached stalks will swing rearward and downward to the ground, and as the machine moves forward the notched portions 143 of the swinging frame members 142 will be withdrawn from the support and the weighted arm 144 will return the swinging frame members 142 again to upright position. The swinging frame members 142 are normally maintained slightly to the rear and out of the path of travel of the stalks and are allowed to advance to receive the loaded support only after a predetermined quantity of stalks have been attached thereto. Thus the swinging frame members are maintained out of the path of travel of the stalks until it becomes necessary to discharge the loaded support from the machine.

Operation of the machine: By the intermittent operation of the machine as before described, the time of operation of the several parts being controlled by the standing stalks to be harvested the various operations are performed in proper time and sequence regardless of the relative location of the plants in their rows. Thus it is immaterial whether the plants be regularly or irregularly spaced in the row, or whether the interval between the plants if regularly spaced is great or small. The construction is such that the various parts of the machine will only operate when a stalk is to be harvested regardless of the frequency with which the stalks are encountered. The machine being drawn across the field by a tractor, horses or other propelling means encounters the standing stalks one at a time, each stalk oscillating the lever 25 to connect the clutch 28 whereby the follower mechanism is caused to operate. As the machine advances the standing stalk before being severed engages and operates the second lever 62, the movement of which sets in operation the elevator mechanism, the transfer mechanism, the spacing devices and after a certain number of stalks have been severed, the support feeding and discharging mechanism are operated through the same control. After having operated the lever 62 the standing stalk is engaged and severed by the reciprocatory severing devices 13, the guiding vane 21 having in the meantime been elevated in the rear of the stalk to support the stalk, and after the severing operation the rotating follower arm and guiding vane 21 carry the stalk laterally onto the shield 17. At this time the severed stalk is engaged by the butt or woody portion thereof by the elevator fingers 52 and 54 carried upon the elevating chain 44 and is lifted from the supporting shield 17 into an inverted position, in which position it is carried rearward to the transfer mechanism. The gripper jaws 74 and 77 carried upon the radial arm 73 of the transfer head 72 now engage the severed stalk and upon the release thereof from the elevator fingers 52 and 54, the transfer head carries the stalk through an arcuate path and impales it upon the movable support or lath which has previously been fed to a position in the path of the oncoming stalk. The pusher fingers 120 carried on the traveling chains 121 now engage the stalk, and after assisting in the impaling process slide it longitudinally upon the lath or support as the said chains 121 are operated through a step by step movement, the steps of which are determined by the engagement of succeeding standing stalks with the control lever 62. The path of travel of the severed stalks is indicated by dot and dash lines in Fig. 2, the positions of the severed stalks being shown on said lines by the black disk. After a predetermined number of stalks have been impaled upon the lath or support the lath or support is released and another lath is fed from the magazine. The loaded lath or support is discharged from the machine by the swinging frame members 142. The plant being rather bushy and having comparatively broad leaves will afford some resistance to the air as the swinging frame 142 moves downward, thereby cushioning the fall of the plant upon the ground, and obviating danger of injuring the plant by violent contact with the ground upon its discharge from the machine.

From the above description it will be apparent that there is thus provided a machine of the character described possessing the particular features of advantage before enumerated as desirable, but which obviously is susceptible of modification in its form, proportion, detail construction and arrangement of parts, without departing from the principle involved or sacrificing any of its advantages.

Having thus described my invention I claim:

1. In a tobacco hanger, a main frame having severing devices thereon, a conveyer extending upward in an inclined direction from the severing devices and adapted to independently engage the butt of each stalk allowing the leaves thereof to extend in a pendant position from each conveyer, a supporting member to which the stalks are conveyed in a pendant position by said conveyer, means for independently securing the stalks in spaced relation upon the support, substantially as specified.

2. In a tobacco hanger, a main frame having severing devices thereon, a conveyer inclined upward from the severing devices, engaging devices upon the conveyer for independently engaging the butt of each stalk permitting the leaves thereof to extend free of the conveyer, means to reverse the position of the severed stalk whereby the stalk will be conveyed in a pendant position with its leaves free and downward, a support to which the stalks are carried by the conveyer, means for independently attaching the stalks to said support in an inverted pendant position, and means for automatically discharging the support from the machine when a predetermined quantity of stalks have been collected thereon.

3. In a harvesting machine, a traveling main frame, severing devices carried thereby, intermittently operated conveying mechanism for the severed stalks, a support to which the stalks are conveyed by the conveyer, means for securing the stalks upon the support, and trip mechanism operated by engagement with the standing stalk to be harvested whereby the conveyer will be operated only when a stalk is to be delivered to the support, thereby avoiding any vacant positions upon the support, substantially as specified.

4. In a tobacco hanger, a main frame, a support carried thereon, means for securely gripping each stalk to be attached and for forcibly projecting the stalk upon the sharpened end of the support whereby it will be impaled thereon, and means for advancing the impaled stalks upon the support through a step by step movement to predetermined spaced relation.

5. In a harvesting machine, a main frame, severing devices, impaling devices intermittently operated, conveying mechanism adapted to carry the severed stalks from the severing devices to the impaling devices, and means operated by engagement with the standing stalks to be harvested for causing the operation of the conveying means, whereby said conveying devices will be operated only when a succeeding stalk is to be impaled, thereby avoiding vacancies in the succession of impaled stalks.

6. In a tobacco hanger, a main frame, a sharpened support upon which the severed stalks are to be impaled carried upon said frame, means to engage the butts of the severed stalks at a point removed from the sharpened end of the support and present the severed stalks to the sharpened extremity of the support in an inverted pendant position with the butt of the stalk alined with the support, means for slidingly adjusting the impaled stalks upon the support, substantially as specified.

7. In a tobacco hanger, a main frame, an oscillating head carrying a swinging arm oscillating in a horizontal plane, gripper jaws carried by said swinging arm adapted to engage the butt of the stalk whereby the stalk will be suspended from the arm in inverted position, a sharpened support projecting into the path of the swinging arm upon the sharpened end of which the stalk is forcibly projected by the movement of the swinging arm and means to cause the release of the gripper jaws after the stalk has been impaled upon the support, substantially as specified.

8. In a harvesting machine, a traveling main frame, severing devices thereon, a support upon which the stalk is to be impaled, a movable arm, a gripper member carried by the arm and adapted to engage the butt of the stalk thereby centering the stalk butt in relation to the support, and by a movement of the arm to forcibly project the stalk upon the support while still engaged by the gripper member, and means to cause the release of the gripper member after the stalk has been impaled, substantially as specified.

9. In a harvesting machine, a main frame having severing devices thereon, conveyer means for the severed stalks comprising a traveling arm, gripper members carried by the said arm, cam faces engaged at different points in the path of travel of said arm whereby the gripper member will be operated to engage and disengage the stalks, and a support upon which the engaged stalk is projected by the swinging arm.

10. In a harvesting machine, a main frame having severing devices thereon, conveyer means for the severed stalks comprising a traveling arm, a gripper jaw carried on said arm, a reciprocatory member supported on the arm, a second gripper jaw carried by the reciprocatory member, cam faces engaged at predetermined points in the path of travel of the arm adapted to cause a reciprocatory movement of the said reciprocatory member causing the gripper jaws to vary in their relation to each other whereby the jaws will be caused to engage and disengage the severed stalks and a support upon which the engaged stalks are forcibly projected by the movement of said arm.

11. In a harvesting machine, a main frame having severing devices thereon, conveying means for the severed stalks comprising a revoluble shaft, an arm carried by said shaft, a gripper jaw supported on the arm, a second gripper jaw also carried by the arm and movable in relation to the first mentioned jaw, a cam member, means connected with the movable jaw engaging the cam member and thereby shifting the said jaw at predetermined points in the path of travel whereby the jaws will be caused to engage and disengage the severed stalks and a support upon which the engaged stalks are forcibly projected by the movement of said arm.

12. In a harvesting machine, a main frame having severing devices thereon, conveying mechanism, a support upon which the severed stalks are impaled, a traveling member adapted to engage the impaled stalks and shift them longitudinally upon the support through successive steps of a step by step movement after being impaled thereon.

13. In a harvesting machine, a traveling main frame having severing devices thereon, carrying wheels, severing devices, means for reversing the position of the severed stalk, means for securing the severed stalks in inverted position upon movable supports, and means for discharging the supports and attached stalks.

14. In a harvesting machine, a main frame, having severing devices thereon, carrying wheels, conveyer means for the severed stalks comprising an endless traveling belt, gripper members carried by the endless belt, means for automatically operating the gripper members to engage and disengage the stalks at predetermined points in their path of travel, and a swinging member having stalk engaging means thereon adapted to engage the severed stalks when released by said gripper members and convey the severed stalks through an arcuate path, and means to cause the stalk engaging means to release the stalk at a predetermined point in its path of travel.

15. In a harvesting machine, a main frame having severing devices thereon, carrying wheels, an intermittently operated follower member adapted to support and guide the severed stalk and means operated by the standing stalk to be harvested for causing the operation of the follower member.

16. In a harvesting machine, a main frame having severing devices thereon, carrying wheels, an intermittently operated follower member adapted to engage the side of the stalk opposite the severing devices, actuating mechanism therefor including a main drive shaft, a driven shaft, a clutch member, a yielding member projecting into the path of the standing stalk adapted by its operation to cause the engagement of the clutch to actuate the follower member.

17. In a harvesting machine, a main frame having severing devices thereon, carrying wheels, a follower member moving in a horizontal plane adapted to engage the side of the stalk opposite the severing devices and means for tilting the follower member in a vertical plane to deflect the stalk in the desired direction.

18. In a harvesting machine, a main frame having severing devices thereon, carrying wheels, a follower arm adapted to engage the side of the standing stalk opposite the severing devices, a guiding vane carried by the follower arm, and means to oscillate the vane in relation to the swinging arm to guide the stalk after being severed.

19. A harvesting machine, a main frame having severing devices thereon, carrying wheels, a follower arm adapted to engage the side of the standing stalk opposite the severing devices, a sleeve journaled on said arm, a guiding vane carried by the sleeve, a gear member also carried by the sleeve, and a stationary rack member engaged by the gear member in its path of travel whereby the sleeve will be rotated upon the follower arm to oscillate the guiding vane thereabout.

20. In a harvesting machine, a main frame having severing devices, carrying wheels, a swinging arm adapted to engage the side of the standing stalk opposite the severing devices, a guiding vane pivotally carried by the swinging arm, and means to oscillate the guiding vane about said swinging arm to support the stalks after being severed.

21. In a harvesting machine, a main frame having severing devices thereon, carrying wheels, a revolving head, follower arms carried by the head, guiding vanes carried by the follower arms, and means to oscillate the guiding vanes about their connection with the follower arms in planes angular with the plane of movement of said follower arms at predetermined points in the rotation of the revolving head.

22. In a harvesting machine, a main frame having severing devices thereon, carrying wheels, a revolving head, follower members carried by said head and adapted to engage the stalk prior to the severing thereof and to support the stalk during the severing operation, and means to intermittently operate said follower members including a non-repeat clutch adapted to automatically disconnect the driving mechanism of the follower members after the severing operation has been completed, and a clutch operating device adapted to engage the stalk to be harvested whereby said clutch will be connected.

23. In a harvesting machine, a main frame having severing devices thereon, carrying wheels, intermittently operated conveying mechanism adapted to receive the severed stalks, actuating mechanism therefor including a drive clutch member, a clutch operating member projecting into the path of the standing stalk to be harvested and when operated by engagement therewith adapted to connect the drive clutch whereby the conveyer mechanism will be operated through a predetermined degree of movement.

In testimony whereof, I have hereunto set my hand this 11th day of March, A. D. 1911.

FREDERICK H. COOK.

Witnesses:
 HARRY F. NOLAN,
 NELLE M. JOHNSON.